United States Patent [19] [11] Patent Number: 4,661,013
Jenkins [45] Date of Patent: Apr. 28, 1987

[54] APPARATUS FOR IMPEDING FINE SEDIMENT DEPOSITION IN HARBORS AND NAVIGATIONAL CHANNELS

[75] Inventor: Scott A. Jenkins, San Diego, Calif.

[73] Assignee: The Regents of the University of California, Berkeley, Calif.

[21] Appl. No.: 751,332

[22] Filed: Jul. 2, 1985

[51] Int. Cl.⁴ ............................................. E02B 8/02
[52] U.S. Cl. ...................................... 405/74; 405/15; 405/52
[58] Field of Search ...................... 405/15, 23, 25, 26, 405/52, 60, 73, 74

[56] References Cited

U.S. PATENT DOCUMENTS

| 139,569 | 6/1983 | Garnham | 405/73 X |
| 1,042,792 | 10/1912 | Henderson | 405/74 X |
| 1,858,231 | 5/1932 | Parshall | 405/74 |
| 3,222,871 | 12/1965 | Miller et al. | 405/73 |
| 3,691,774 | 9/1972 | Hard | 405/26 |
| 3,892,075 | 7/1975 | Tibbett | 405/25 X |
| 3,971,221 | 7/1976 | Greenleaf | 405/26 |
| 4,036,022 | 7/1977 | Larsen | 405/74 |
| 4,264,233 | 4/1981 | McCambridge | 405/26 |

FOREIGN PATENT DOCUMENTS

| 835873 | 7/1949 | Fed. Rep. of Germany . | |
| 83/01799 | 5/1983 | PCT Int'l Appl. | 405/60 |
| 23118 | of 1894 | United Kingdom . | |
| 1514461 | 6/1978 | United Kingdom | 405/26 |

538090 4/1977 U.S.S.R. ................................ 405/74

OTHER PUBLICATIONS

"Vortex Induced Lift on Two Dimensional Low Speed Wings", by P. G. Saffman and S. Tanveer, Studies in Applied Mathematics, 1984, Massachusetts Institute of Technology.

Primary Examiner—Cornelius J. Husar
Assistant Examiner—Nancy J. Stodola
Attorney, Agent, or Firm—Brown, Martin, Haller & Meador

[57] ABSTRACT

An apparatus for mounting adjacent the bottom of a waterway having a current for impeding the deposition of suspended sediments upon the bottom of the waterway. A buoyant wing member having leading and trailing edges with substantially flat top and bottom surfaces includes a flap member spanning the wing member and extends at a predetermined upward angle away from the top surface towards the leading edge. The apparatus is mounted with the flap member facing the bottom of the waterway wherein the fluid in the wake is accelerated upwards away from the waterway bottom so as to resuspend fine sediments. When the wing member is mounted with the flap member directed away from the waterway bottom the wake is directed downwards against the bottom causing scouring of the waterway bottom.

25 Claims, 14 Drawing Figures

APPARATUS FOR IMPEDING FINE SEDIMENT DEPOSITION IN HARBORS AND NAVIGATIONAL CHANNELS

BACKGROUND OF THE INVENTION

I. Field of the Invention

The present invention relates to the maintenance of sufficient water depth in harbors and navigation channels. More specifically, the present invention relates to an improved apparatus for scouring and resuspending sediments transported in the waterway by natural currents.

II. Background Art

The present invention is an improvement of a buoyant wing disclosed in applicant's copending U.S. patent application Ser. No. 513,865, filed July 14, 1983 entitled "Method and Apparatus for Impeding Sediment Deposition in Harbors and Navigational Channels", now U.S. Pat. No. 4,560,304 issued Dec. 24, 1985, the disclosure being incorporated by reference herein. The wing disclosed in the previous application was configured as a buoyant high aspect ratio delta wing having an inverted airfoil shape for producing a downward lift force when anchored at a negative angle of attack adjacent the bottom of the waterway having a current. The net vertical deflection and turbulant trailing wake generated as the water flows past the wing prevents sediments from depositing on the bottom of the waterway for a predetermined distance downstream of the wing. Cascading arrays of the wings may be anchored in succession along the waterway to scour and resuspend sediments and thereby maintain sufficient water depth for navigation while avoiding the cost of environmental drawbacks of dredging. The buoyant high aspect ratio delta wings are generally constructed of a urethane foam injected into a steel reinforced concrete mold. The urethane foam has a high density, such as 16 pounds per cubic foot, and may be poured into a partition section of the mold to create a spanwise extending wing spar in the thickest portion of the hydrofoil cross section. The remainder of the wing may be made of urethane foam having a lower density such as 2 pounds per cubic foot. The wing is typically covered with resin impregnated fiberglass. The foam used is typically sufficient to withstand the pressure encountered underwater without deformation. A wing with a 20 foot wingspan generally creates 600 pounds of useable lift while displacing up to 2500 pounds of water. As a result, the wing would need to be ballasted to approximately 1900 pounds dry weight to maintain 600 pound of net buoyancy. To achieve the 1900 pounds of ballasted weight results in the need to use excess materials.

It is therefore an object of the present invention to provide a new and improved wing profile which produces increased wing turbulence and high lift when mounted adjacent the bottom of a waterway having a current for resuspending sediments or scouring the bottom of the waterway.

It is yet another object of the present invention to provide a wing profile which has a reduced displacement volume and reduced structural weight while providing high lift and increased turbulance.

SUMMARY OF THE INVENTION

The present invention provides an appartus for mounting adjacent the bottom of a waterway having a current for impeding the deposition of suspended sediments upon the bottom of the waterway. The invention includes a buoyant wing member having leading and trailing edges with substantially flat top and bottom surfaces with a flap member spanning the wing member and extending at a predetermined upward angle from the top surface towards the leading edge. A pair of standing eddies are formed when a current flows by the wing and flap member with one of the standing eddies formed adjacent to the top surface between the leading edge and a flap member. The other standing eddy is formed adjacent the top surface rearwardly of the flap member. The apparatus may be mounted in a berthing array comprised of a plurality of downwashing wings located beneath a vessel and a plurality of upwashing wings are located about the perimeter of the vessel. The interior downwashing wings have the flap member facing away from the waterway bottom to produce bottom scouring. The perimeter wings are mounted with the flap member facing the bottom to produce downward lift for resuspending sediments upwardly.

In an alternate embodiment the wings are mounted in a tuned array within a channel by cascading of a plurality of alternating upwashing and downwashing wings in the direction of the current. This arrangement generates internal wave motions near the bottom which enhance the scour and resuspension action of the wing array.

BRIEF DESCRIPTION OF THE DRAWINGS

The objects, features and advantages of the present invention will be more fully apparent from the detailed description set forth below, taken in conjunction with the accompanying drawings in which like reference characters correspond throughout and wherein.

DETAILED DESCRIPTION OF THE PREFERRED EMBODIMENTS

Figures 1, 2:
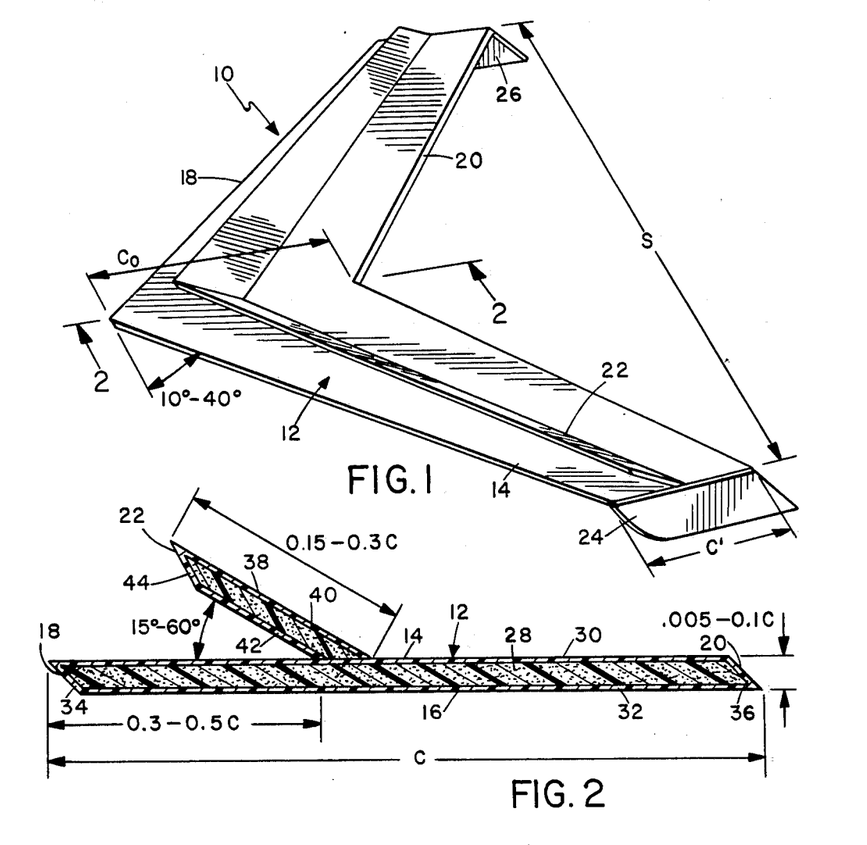
FIG. 1 is a perspective view of one embodiment of the wedgewing of the present invention.
FIG. 2 is an enlarged sectional view taken on Line 2—2 of FIG. 1.

FIG. 1 illustrates a perspective view of one embodiment of the wedgewing 10 of the present invention. Wedgewing 10 is comprised of a buoyant wing member 12 having top surface 14 and bottom surface 16 which are both substantially flat. Mounted upon top surface 14 between the leading edge 18 and trailing edge 20 is a forward facing flap or flap member 22. A pair of downwardly extending end plates or tip plates 24 and 26 are each attached at a predetermined angle, typically 10°, from a perpendicular plane of wing member 12. Tip plates 24 and 26 function as vertical stabilizers, producing yaw damping for wedgewing 10.

Wedgewing 10 is preferrably constructed in a swept back configuration with a sweepback angle in the range of 10°–40°. The aspect ratio is typically within the range of 3:1 to 12:1 with a preferred aspect ratio in the range of 3:1 to 8:1. As the aspect ratio increases beyond 8:1 the strength of trailing vortices is weakened and the corresponding effect of scour and upwash are diminished. The aspect ratio, A, is determining by the following equation:

$$A = \frac{2S}{C + C'} = \frac{S^2}{\text{WING AREA}}$$

where
 S is the span of the wing,
 $C_o$ is the center chord length and,
 $C'$ is the end chord length in a tapered wing.

An exemplary span would typically be 20 feet with chord length $C_o$ 5 feet and chord length $C'$ equalling 3 feet. The wing member usually tapers down in chord length as it extends from a central portion of the wing to the end. Although illustrated as a single taper wing, multitaper planforms of corresponding aspect ratio are functionally equivalent, but more complex to fabricate.

FIG. 2 illustrates a typical cross section of the construction of the wing of FIG. 1. Wing member 12 is constructed in a sandwich configuration with a central core 28 being a flat sheet of closed cell PVC foam or polyurethane foam having a density greater than 3 pounds per cubic foot. Core 28 is sandwiched between an upper layer 30 and lower layer 32 which are constructed of bidirectional fiberglass cloth having a 8–16 ounce per cubic foot weight or material such as kevlar or AS-2 graphite cloth. A polymer resin such as polystyrene or epoxy (polyamide) or any other type of low porosity resin is used to reinforce and encapsulate the cloth covered core. Leading and trailing edges 18 and 20 are similarly constructed with the core being cut at an angle and similarly covered with the cloth and resin at leading edge layer 34 and trailing edge layer 36. The thickness of the sandwiched wing member from top surface 14 to bottom surface 16 is typically in the range of 0.005–0.1 C, where $C = C_o$ and $C_o$ is the root chord length.

Flap member 22 is similarly constructed to that of wing member 12 having a core 38 covered by a cloth reinforced resin to player 40 bottom layer 42 and leading edge layer 44. The vertex of the flap member is positioned upon top surface 14 in the range of 0.3–0.5 C from the tip of the leading edge while having a length measured from top surface 14 to the tip of flap member 22 of 0.15–0.3 C. Flap member 22 includes an sharp angled leading edge for inducing the flow separation that spawns formation of the standing eddies necessary for the wedgewing section to generate circulation and lift.

Figures 3, 5:
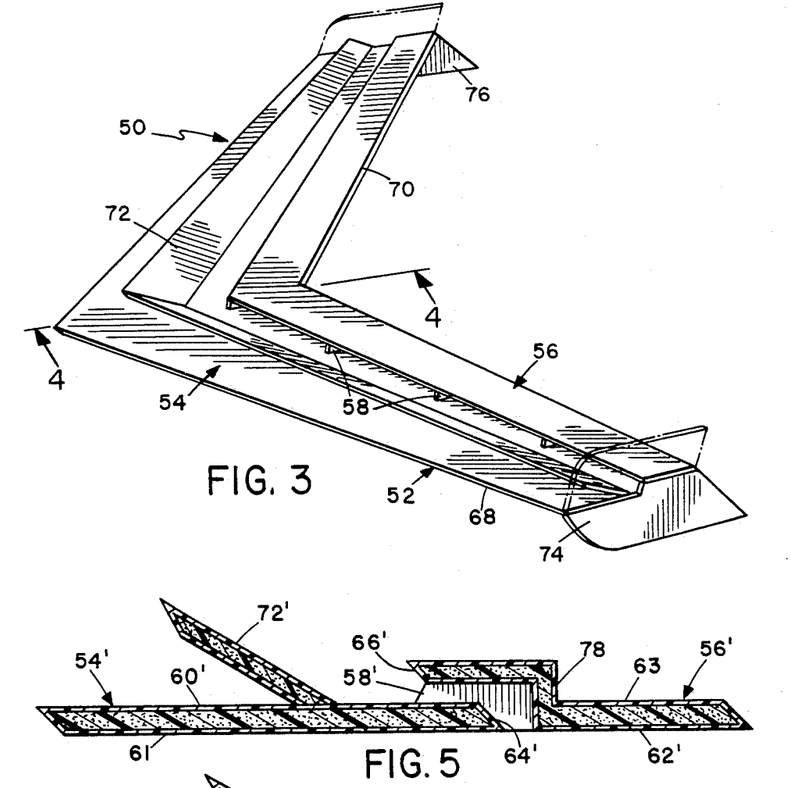
FIG. 3 is a perspective view of an alternate embodiment of the wedgewing of the present invention.
FIG. 5 is an enlarged sectional view of an alternate construction of the wedgewing.
Figure 4:
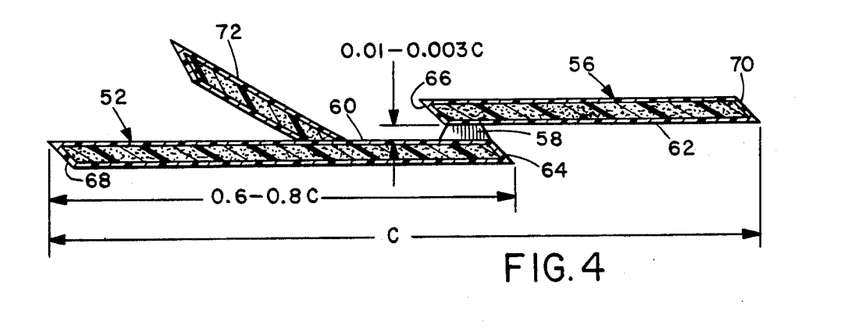
FIG. 4 is an enlarged sectional view taken across Line 4—4 of FIG. 3.

FIGS. 3 and 4 respectively illustrate a perspective view and an enlarged sectional view of an alternate embodiment of the wedgewing. In FIGS. 3 and 4, wedgewing 50 is constructed similarly to wedgewing 10 of FIG. 1 except for a variation in the wing member, wing member 52 has a leading portion 54 and a trailing portion 56. Trailing portion 56 is vertically offset from leading portion 54 so as to form a spanwise slot therebetween. A plurality of rib members 58 are positioned along leading portion 54 and interconnect top surface 60 with bottom surface 62 of trailing portion 56. The rear edge 64 of leading portion 54 along with the forward edge 66 of trailing portion 56 are angled at approximately the same angle as the respective, leading and trailing edges 68 and 70 of the wing member. The length of leading portion 54 is typically in the range of 0.6–0.8 C from the tip of leading edge 68 to the tip of rear edge 64. The slot distance between top surface 60 and bottom surface 62, is typically in the range of 0.01–0.003 C. Flap member 72 is mounted upon top surface 60 of leading portion 54 at an angle and length as previously described with reference to FIGS. 1 and 2.

Both leading portion 54 and trailing portion 56 are swept back and maintain chord and span distances as discussed with reference to FIG. 1. Endplates 74 and 76 are each coupled at an opposite end of wing member 50 and extend downwardly at a predetermined angle, typically 10° from the perpendicular of the plane of the top surfaces of wing member 52. FIG. 3 illustrates this arrangement for the downwashing configuration. The tip plates are reversed for the upwashing configuration as indicated by dashed lines.

FIG. 5 illustrates an enlarged sectional of an embodiment of the wing of FIGS. 3 and 4. In FIG. 4, top and bottom surfaces (60' and 61) of leading portion 54' and the top and bottom surfaces (62' and 63) of trailing portion 56' are substantially coplanar. The forward section (adjacent forward edge 66') of trailing portion 56' is vertically offset and supported by a vertical wall 78 so as to extend above and overlap the rear section (adjacent rear edge 64') of leading portion 54' thereby forming a slot therebetween. A plurality of rib members 58' interconnect the rear portion of leading portion 54' with the forward portion of trailing portion 56'.

Figure 6:
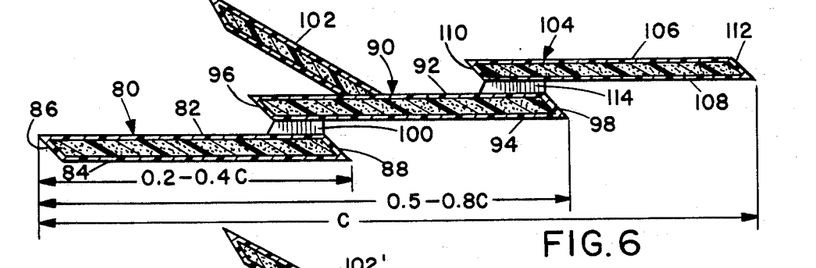
FIG. 6 is an enlarged sectional view of a dual slotted wedgewing.

FIG. 6 illustrates yet by an enlarged sectional view yet another embodiment of the present invention wherein the wing member is comprised of three vertically offset portions. The first portion is a leading portion 80 having substantially flat top and bottom surfaces (82 and 84) with angled forward and rear edges (86 and 88) with edge 86 being the wing member leading edge.

Spaced above and vertically offset from the rear section of leading portion 80 is central portion 90. Central portion 90 has substantially flat top and bottom surfaces (92 and 94) with angled forward and rear edges (96 and 98). The forward section (adjacent forward edge 96) of central portion 90 extends forward and overlaps of the rear edge 88 of leading portion 80. The vertically offset nature of portions 80 and 82 form a slot therebetween. A plurality of rib members 100 are spaced along the span within the slot between portions 80 and 82 for interconnection of the portions. Portion 90 includes on top surface 92 flap member 102 which extends in a forward direction towards a forward edge 96 of portion 90.

Spaced above and vertically offset above the rear section (adjacent rear edge 98) of central portion 82 is trailing portion 104. Trailing portion 104 has substantially flat top and bottom surfaces (106 and 108) with angled forward and rear edges (110 and 112). Rear edge 112 acts as the wing member trailing edge. The forward section (adjacent edge 110) of trailing portion 104 extends forward of the rear edge 98 of central portion 90. A slot is formed betwen the top surface 92 of central portion 90 and the bottom surface 108 of trailing portion 104. A plurality of rib members 114 are located within the slot along the span so as to interconnect central portion 90 to trailing portion 104.

Leading portion 80 is typically in the range of 0.2-0.4 C in length from the tip of forward edge 86 to the tip of rear edge 80. Central portion 90 is positioned such that the tip of forward edge 86 of front portion 80 to the tip of rear edge 98 at central portion 90 is in the range of 0.5-0.8 C in length.

Figure 7:
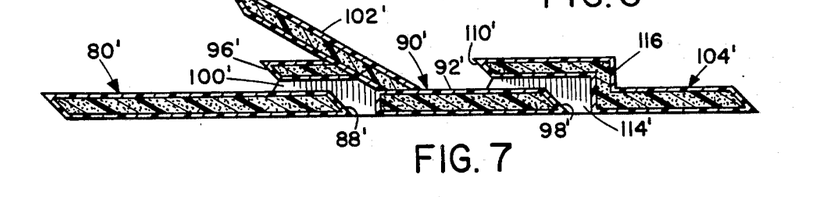
FIG. 7 is an enlarged sectional view of an alternate construction of the dual slotted wedgewing.

FIG. 7 illustrates an enlarged sectional view of an alternate construction of the wedgewing of FIG. 6. In FIG. 7, leading portion 80', central portion 90' and trailing portion 104' are in a coplanar arrangement with the flap member 102' extending also from a top surface 92' of central portion 90'. A forward section (adjacent front edge 96') of central portion 102 is integrated into a lower portion of flap member 102'. The forward section of central portion 90' is located above and spaced apart from the rear section (adjacent rear edge 88') of leading portion 80. A rear section of central portion 90' has flap member 102' mounted on top surface 92. A slot is formed between the integrated flap member front and rear sections of central portion 90' and rear section of leading portion 80'. A plurality of rib members 100 are spaced along the span of the wing within the slot between the leading and central portion and interconnect leading portion 80', flap member 102' and central portion 90' in a slot forming a spaced apart arrangement. Trailing portion 104' includes a vertical section 116 which interconnects the vertically offset forward section (adjacent forward edge 110') of trailing portion 104' to the rear section (adjacent rear edge 98') of central portion 90'. Vertical member 116 is spaced apart from the rear edge of central portion 90 with the forward section of trailing portio 104' extending forward of vertical member 116 and overlapping in a spaced-apart relationship central portion 90' so as to form a slot therebetween. A plurality of rib members 114 interconnect within the slot trailing portion 104' to central portion 90'.

It has been discovered for wing structures to be effective scouring devices or sediment control devices that this efficiency is in direct proportion to the amount of lift created by the wing. In conventional terms the production of lift is accomplished by making the flow go over one side of the wing faster than it goes over the other side with the flow merging at a sharp trailing edge.

Figure 8:
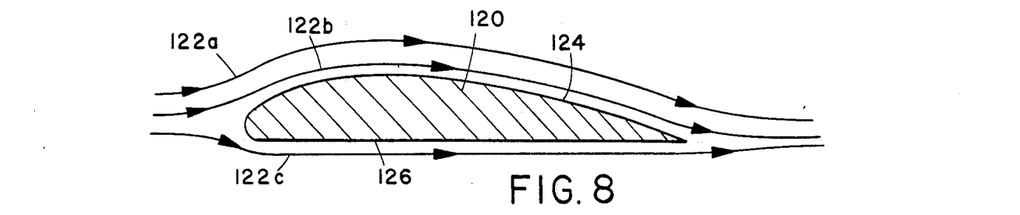
FIG. 8 is a schematical fluid flow diagram about a conventional double surface hydro foil section.

FIG. 8 illustrates in a cross sectional flow diagram a conventional double-surfaced hydrofoil curved wing section 120 with the flow indicated about the wing by the streamlines 122a-122c. As the flow travels the farther arc path over the curved upper surface 124 (indicated by streamlines 122a and 122b) it develops circulation which produces a lower pressure than the flow at the lower surface 126. It is the lower pressure about the upper surface that creates the upward lift force which in turn causes a reaction in 3-dimensions to the fluid flow and accelerates the wake in the opposite direction, e.g. downward away from lower surface 126, of the lift.

Figure 9:
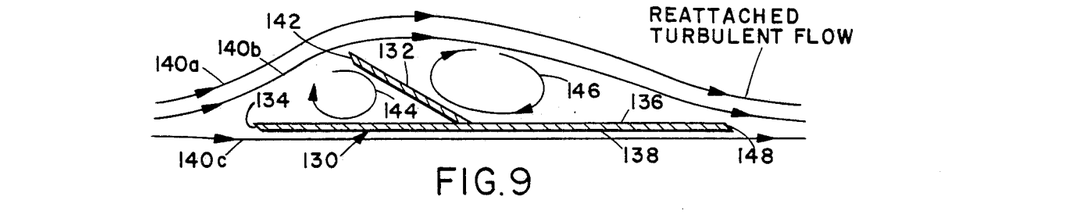
FIG. 9 is a schematical fluid flow diagram of the wedgewing section.

FIG. 9 illustrates in a cross sectional flow diagram a wedgewing section of the present invention comprised of a flat wing member 130 having the angled flap member 132 extending in a direction of the angled leading edge 134 at a predetermined angle from the top surface 136 of wing member 130. The approaching flow is divided at the leading edge 134 such that portions of it flow smoothly along the lower surface as indicated by streamline 140c, while the remaining portion of flow separates at the leading edge 134 and proceeds over the top of the forward facing flap as indicated by streamlines 140a and 140b.

The separated flow travelling above wing member 130 is separated by an angled leading edge 142 of flap member 132 such that a portion of the flow creates a standing eddy (indicated by streamline 144) in the region forward of flap 132 and above upper surface 136.

After a portion of the flow is separated by the flap member and the remainder of the flow continues to travel above upper surface 136 rearward of flap 132. As a result, a second standing eddy (indicated by streamline 146) is created rearward of flap 132 and above upper surface 136. The circulation of the standing eddy 146 induces the flow to reattach downstream of this eddy to top surface 13c near trailing edge 148. Flap member 118 in creating standing eddies 120 and 122 replicate the curved surface and resulting streamlines of a curved double surface hydrofoil such as illustrated in FIG. 8. The standing eddies cause the flow about the upper surfaces of the wing of FIG. 9 to traverse a large curved path before it finally reattaches and meets the undersurface flow at the trailing edge. It is this standing eddy induced circulation that is creating a very large lift in the wedgewing.

Figure 10:
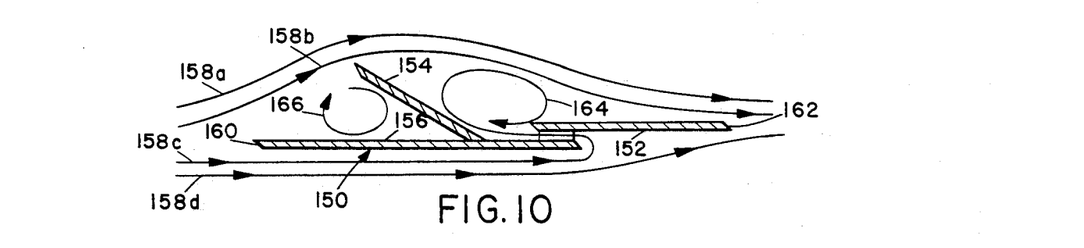
FIG. 10 is a schematical fluid flow diagram about a slotted wedgewing section.

FIG. 10 illustrates an alternate embodiment of the wedge wing in a cross-sectional flow diagram. The wing member is comprised of leading portion 150 and trailing portion 152 which is vertically offset and overlapping the rear section of leading portion 150 so as to form a slot therebetween. Flap member 154 is attached in a forward facing direction upon top surface 156 of leading portion 150.

The flow (indicated by streamlines 158a-158d) is divided by leading edge 160 of leading portion 150 wherein a portion of the flow (indicated by streamlines 158c and 158d) travel along the bottom of the wedgwing while a portion of the flow (indicated by streamlines 158a and 158b) flow separates above the top of the wedgewing. With respect to streamlines 158c and 158d, as the flow continues in a direction towards the trailing edge 162 of trailing portion 152, flow is directed through the slot between leading portion 150 and trailing portion 152 (as illustrated by streamline 158c). The flow in the slot stabilizes and reinforces the standing eddy 164 generated above the trailing portion 152 rearward of flap member 154. Flow further away from the bottom of the wedgewing section (as illustrated by streamline 158d) continues beyond trailing edge 162. Flow above the wedgewing (indicated by streamlines 158a and 158b) continues along the wedgwing with a portion of the flow creating standing eddy 166 as was discussed with reference to FIG. 9.

Figure 11:
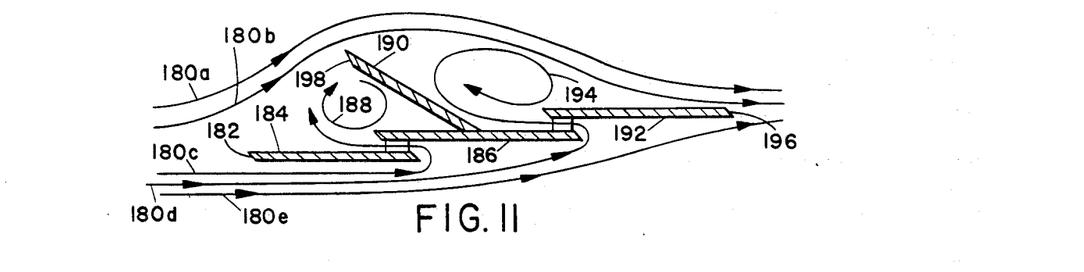
FIG. 11 is a schematical fluid flow diagram of a dual slotted wedgewing section.

FIG. 11 illustrates an alternate embodiment of the wedgewing in a cross-sectional flow diagram. The flow (indicated by streamlines 180a–180e) is divided at leading edge 182 of wing member leading portion 184 wherein a portion of the flow (streamlines 180c–180e) separating flows beneath the wedgewing with another portion of the flow (streamlines 180a–180b) separating above the wedgewing section.

A portion of the flow (streamline 180c) flows through the slot between the leading portion 184 and central portion 186. This portion of the flow (streamline 180c) stabilizes and reinforces standing eddy 188 located forward of the flap 190 above the wedgewing.

Similarly a portion of the flow (streamline 180d) flows through the slot between central portion 186 and trailing portion 192. This portion of the flow (streamline 180d) stabilizes and reinforces standing eddy 194 located rearward of flap member 190 above the wedgewing. The flow further away from the bottom of the wedgewing (indicated by streamline 180e) continues flowing beneath the wedgewing where it reattaches with the flow from above at the trailing edge 196 of trailing portion 192.

Leading edge 182 of leading portion 184 causes flow (indicated by streamlines 180a and 180b) to flow above the wedgewing wherein a portion of the flow is separated by the leading edge 198 of flap member 190 to create standing eddies 188 and 194. The streamlines 180a and 180b continue above the wedgewing where they reattach with the flow from beneath the wedgewing rearward of trailing edge 196.

In each of the embodiments of FIGS. 9–11 the flap member in combination with the wing member which has flat top and bottom surfaces creates substantially similar lift characteristics as the wing of FIG. 8 with a reduced amount of displacement volume.

The slots in FIG. 10 and FIG. 11 are utilized for generating stable standing eddies over a large range of angles of attack when the wedgewing is mounted adjacent bottom of a waterway. Without these slots, standing eddies are difficult to maintain in the presence of natural current variations or rapid attitude changes of the wing resulting from such variations. These standing eddies are basically generated by the velocity shear between high velocity flow coming off the top of the flap member in the presence of opposed flow near the flap member bottom which is coming through the slot. Without these slots, the lower flow is being retarded by the wall friction and the shear is prone to instability. However, when slots are by-passing fluid from the high pressure undersurface, the accelerated flow coming out of the slot is directed opposed to the external flow over the top of the flap such that it creates a zonal stress, which naturally induces stable rotation.

Figure 12:
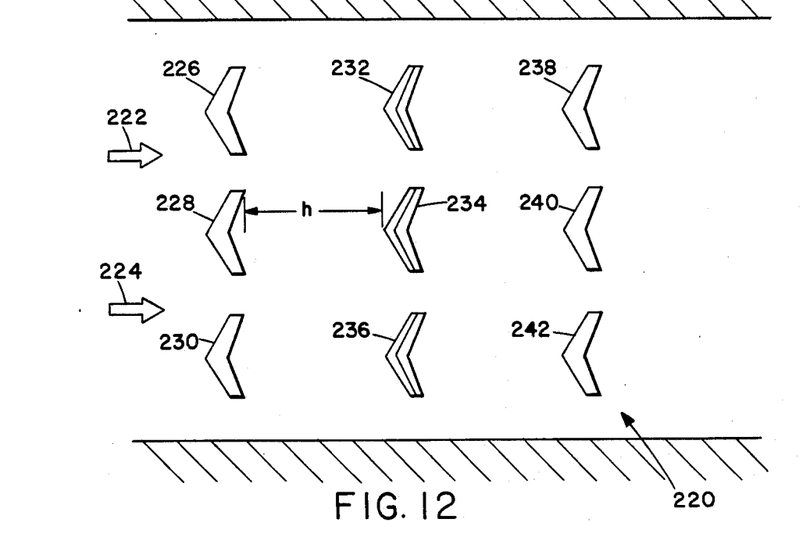
FIG. 12 is a schematical illustration of the placement of cascaded rows of upwashing and downwashing wedgewings in a channel array.

FIG. 12 illustrates a plurality of cascaded rows of alternating downwashing and upwashing wings positioned within a channel 220 in a tuned array. Arrows 222 and 224 indicate the direction of flow within channel 220. The first row of upstream wings, wings 226, 228 and 230, are upwashing wings while an adjacent downstream row of wings, wings 232, 234 and 236, are downwashing wings. Further downstream of the downwashing wings is another row of upwashing wings, wings 238, 240 and 242. The wings in each row are moored adjacent each other with sufficient distance therebetween to prevent overlapping and collision of the adjacent wings. It is preferred that the wings be mounted in the channel at "project depth" which is the designed depth of the channel. The alternating rows of downwashing and upwashing wings create a wavy waterway bottom with the crests in the wavy bottom being located beneath the upwashing wings. Starting at project depth in this installation the highest point of the bottom will remain at project depth. Beneath the downwashing wings, which scour the bottom, the bottom will be below project depth.

The rows of alternating upwashing and downwashing wings are spaced apart in a tuned array by a distance based upon the density ratio where:

$$h = n\left(\frac{\Delta\rho}{\rho}\right) \cdot \left(\frac{u^2}{g}\right)$$

where h is the distance between rows,
n = any positive integer (1, 2, 3...),
Δρ = density of the sediment laidened lower layer minus the density of the upper layer or clear layer ($\rho_{lower} - \rho_{upper}$),
ρ = density of the upper layer,
g = acceleration of gravity, and
u = bottom current at neap tide.

Typically the channel has basically an upper layer and a lower layer. The lower layer is where the sediment is and is called the floc layer. The upper layer is typically low salinity fluvial water. The use of neap tide as the determinate for the variable u in the equation is used because it is this period when there is the smallest difference between high and low tides. At neap tide the bottom current is at its weakest, thereby resulting in the greatest tendancy for mud to accumulate.

Figure 13:
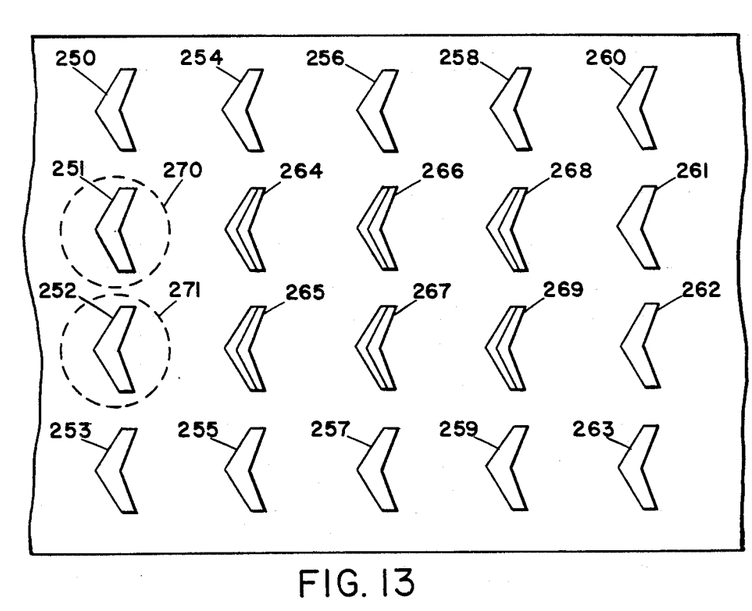
FIG. 13 is a schematical illustration of the arrangement of upwashing and downwashing wedgewings of the present invention in a berthing array.

FIG. 13 illustrates a berthing array wherein the perimeter wings are upwashing wings and the interior wings are downwashing wings. The perimeter wings are comprised of consecutively numbered wings 250–263 while the interior wings are comprised of consecutively numbered wings 264–269. The interior wings are downwashing so as to scour and prevent the wings from the throwing mud and particulates into the sea suction intakes located on the bottom of a ship. The upwashing perimeter wings lift up the scoured sediments for transport downstream. Considerable downstream transport of these sediments is possible when they are fine and therefore resettle slowly.

The wings are typically placed as dense as possible yet sufficiently spaced apart to prevent collision. The wings are typically placed far enough apart as defined by the watch circles 270 and 271 respectively of wings 251 and 252. Watch circle 270 defines the maximum movement of wing 251 while watch circle 271 similarly defines the maximum movement of wing 252. Watch circles 270 and 271 are spaced apart such that there is no overlap therebetween.

Figure 14:
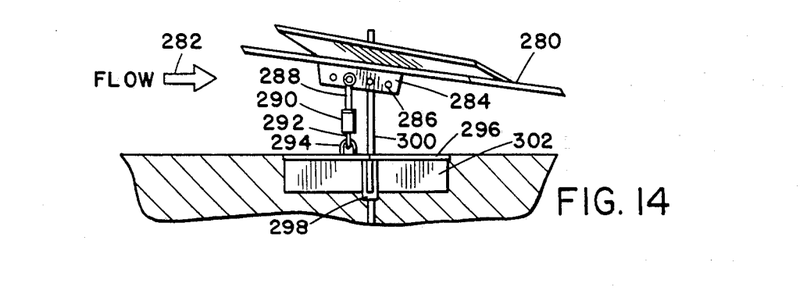
FIG. 14 is a side elevation view of a wedgewing mounted upon a waterway bottom.

FIG. 14 illustrates a typical mounting arrangement of a wedgewing 280 having a leading edge facing the direction of flow as indicated by arrow 282. Attached to the bottom of wedgewing 280 is a mounting plate with a plurality of spaced apart adjustment mooring holes 286. A shackle connection 288 is coupled into a selective hole 284 in plate 286. Coupled to the other end of the shackle connection is an axle swivel joint 290. Axle swivel joint 290 has at an end opposite to shackle connection 288 another shackle connection 292. Connector 294, located off center of settling plate 296, interconnects the shackle connection 292 with a settling plate 296. Settling plate 296 includes a cylindrical collar 298 which is perpendicular to plate 296. Cylindrical collar includes a bore therethrough which permits a vertical shaft 300 to extend therethrough. The settling plate 296 slides freely along a shaft 300. The lower end of shaft 300 is fitted with a single turn earth screw which secures the assembly in the hard lower layer of permanent mud. The settling plate levels itself near the upper horizon of the fluid mud bottom 302. As the wing scours mud the settling plate lowers to the new mud horizon. The shaft is slidably mounted to the collar bore to permit sliding movement of the shaft therein. A clearance hole may be provided through the surfaces of the wing to permit shaft clearance as the settling plate lowers. Extending radially outwardly from collar 294 perpendicular to the plane of settling plane 296 are four blades 304. The blades 304 may be respectively welded along the end and side edges to collar 298 and the bottom of settling plate 296. The blades 304 support the lateral bending of shaft 300 in the fluid mud which results from the hydrodynamic drag on the wedgewing 280. The mounting assembly coupled to wedgewing 280 has a weight which exceeds the buoyancy of wedgewing 280. The horizontal settling plate 296 prevents the assembly from settling down into the depths of the fluid mud under its own weight.

As illustrated in FIG. 14, the wing is a downwashing wing mounted at a positive angle of attack while having a flap facing upwards away from the waterway bottom and into the direction of the flow. The downwashing wings generate lift upward to cause a downward deflection of the turbulent to impinge up and scour the bottom. The upwashing wings are typically mounted at a negative angles of attack to generate downward lift and an upwash of the turbulent wake. For an upwashing wing the flap would be facing the waterway bottom. The mounting assembly illustrated in FIG. 14 is a preferred mounting assembly, for either configuration however, other means for mounting the wedgewing upon the bottom of the waterway are well known in the art.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment shown herein, but is to be accorded the widest scope consistent with the principles and novel features disclosed herein.

What is claimed is:

1. An apparatus for mounting adjacent the bottom of a waterway having a current so as to impede the deposition of suspended sediments upon the bottom of the waterway, comprising:
   a wing member having substantially planar top and bottom surfaces, leading and trailing edges extending along the span of said wing member and ends extending between said leading and trailing edges, said wing member for mounting substantially horizontally and spaced above the bottom of a waterway; and
   a flap member mounted spanwise along at least one of said top and bottom surfaces adjacent said leading edge and extending at a predetermined angle away from said one of said top and bottom surfaces towards said leading edge.

2. The apparatus of claim 1 wherein a pair of standing eddies are formed when a current flows by said wing and flap members, one of said standing eddies formed forward of said flap member adjacent said top surface between said leading edge and said flap member, another one of said standing eddies formed adjacent said top surface rearward of said flap member.

3. The apparatus of claim 1 wherein said wing member has a swept back configuration.

4. The apparatus of claim 1 wherein said wing member has a pair of end plates each extending from an opposite end of said wing member at a predetermined angle from a plane perpendicular to the plane of said wing member.

5. The apparatus of claim 1 wherein said wing member includes leading and trailing portions each having a forward edge and a rear edge, the forward edge of said trailing portion being spaced above and overlapping the rear edge of the leading portion and forming a spanwise slot therebetween.

6. The apparatus of claim 5 wherein said flap member is located on said leading portion of said wing member.

7. The apparatus of claim 6 further comprising a plurality of rib members interconnecting said leading portion to said trailing portion.

8. The apparatus of claim 5 wherein said leading and trailing portions are coplanar with said trailing portion having a vertically offset forward edge.

9. The apparatus of claim 5 wherein said leading and trailing portions define vertically offset substantially parallel planes.

10. The apparatus of claim 1 wherein said wing member includes leading, central and trailing portions each having a forward edge and a rear edge, the forward edge of said central portion being spaced above and overlapping the rear edge of said leading portion and forming a spanwise slot therebetween and said forward edge of said trailing portion being spaced above and overlapping the rear edge of said central portion and forming a spanwise slot therebetween.

11. The apparatus of claim 10 wherein said flap memberis located on said leading portion of said wing member.

12. The apparatus of claim 11 further comprising first and second plurality of rib members, respectively interconnecting said leading portion to said central portion and said central portion to said leading portion.

13. The apparatus of claim 10 wherein said leading, central and trailing portions are coplanar with said central and trailing portions having vertically offset forward edges.

14. The apparatus of claim 10 wherein said leading, central and trailing portions respectively define vertically offset substantially parallel planes.

15. The apparatus of claim 1 further comprising means for mounting said wing member substantially horizontal and spaced above the bottom of a waterway.

16. The apparatus of claim 1 wherein said wing member is mounted adjacent a waterway bottom with said flap member extending in a direction away from the waterway bottom.

17. The apparatus of claim 1 wherein said wing member is mounted adjacent a waterway bottom with said flap member extending in a direction towards the waterway bottom.

18. An apparatus for mounting adjacent the bottom of a waterway having a current so as to impede the deposition of suspended sediments upon the bottom of the waterway, comprising:
- a buoyant wing member having substantially planar top and bottom surfaces, leading and trailing edges extending along the span of said wing member and ends extending between said leading and trailing edges, said wing member having a swept back configuration and adapted for mounting substantially horizontally and spaced above the bottom of a waterway;
- a buoyant flap member mounted spanwise along at least one of said top and bottom surfaces adjacent said leading edge and extending at a predetermined angle away from said one of said top and bottom surfaces towards said leading edge;
- a pair of end plates each extending from an opposite end of said wing member at a predetermined angle from a plane perpendicular to the plane of said wing member; and
- wherein a pair of standing eddies are formed when a current flows by said wing and flap members, one of said standing eddies formed forward of said flap member adjacent said top surface between said leading edge and said flap member, another one of said standing eddies formed adjacent said top surface rearward of said flap member.

19. The apparatus of claim 18 wherein said wing member includes leading and trailing portions each having a forward edge and a rear edge, the forward edge of said trailing portion being spaced above and overlapping the rear edge of the leading portion and forming a spanwise slot therebetween.

20. The apparatus of claim 18 wherein said wing member includes leading, central and trailing portions each having a forward edge and a rear edge, the forward edge of said central portion being spaced above and overlapping the rear edge of the leading portion and forming a spanwise slot therebetween and said forward edge of said trailing portion being spaced above and overlapping the rear edge of said central portion and forming a spanwise slot therebetween.

21. A system for impeding the deposition of suspended sediments upon the bottom of a waterway having a current, comprising:
- a first plurality of buoyant wings mounted in a spaced-apart arrangement substantially horizontal to and spaced above the bottom of a waterway;
- a second plurality of buoyant wings mounted in a spaced-apart arrangement about the perimeter of said first plurality of buoyant wings substantially horizontal to and spaced above the bottom of a waterway; and
- wherein each buoyant wings of said first and second plurality of buoyant wings comprises:
- a wing member having substantially planar top and bottom surfaces, leading and trailing edges extending along the span of said wing member and ends extending between said leading and trailing edges; and a flap member mounted spanwise along at least one of said top and bottom surfaces adjacent said edges and extending at a predetermined angle away from said one of said top and bottom surfaces with each buoyant wing of said first plurality of buoyant wings having said flap member extending from said top surface away from the bottom of a waterway and each buoyant wing of said second plurality of buoyant wings having said flap member extending from said bottom surface towards the bottom of a waterway.

22. The system of claim 21 wherein each buoyant wing of said first plurality of a buoyant wings is mounted at a positive angle of attack and each buoyant wing of said second plurality of buoyant wings is mounted at a negative angle of attack.

23. A system for impeding the deposition of suspended sediments upon the bottom of a waterway having a current, comprising:
- a plurality of cascaded rows of buoyant wings mounted substantially horizontal to and spaced above the bottom of a waterway with each buoyant wing in each row of buoyant wings spaced-apart from an adjacent buoyant wing; and
- wherein each one of said buoyant wings comprises:
- a wing member having substantially planar top and bottom surfaces, leading and trailing edges extending along the span of said wing member and ends extendings between said leading and trailing edges; and horizontally and spaced above the bottom of a waterway; and
- a flap member mounted spanwise along at least one of said top and bottom surfaces adjacent said leading edge and extending at a predetermined angle from one of said top and bottom surfaces with said cascaded rows of buoyant wings alternating between a row of buoyant wings having said flap member extending from said top surface away from the bottom of a waterway and a row of buoyant wings having said flap member extending from said bottom surface towards the bottom of a waterway.

24. The system of claim 23 wherein each of said buoyant wings having said flap member extending from said top surface is mounted at a positive angle of attack and each of said buoyant wings having said flap member extending from said bottom surface is mounted at a negative angle of attack.

25. The system of claim 24 wherein each row is spaced-apart from an adjacent row by a distance h, where $$h = n \left( \frac{\Delta \rho}{\rho} \right) \cdot \left( \frac{u^2}{g} \right)$$

and
- $\Delta \rho$ = density of the sediment laidened lower layer minus the density of the upper layer ($\rho_{lower} - \mu_{upper}$),
- $\rho$ = density of the upper layer,
- g = acceleration of gravity,
- u = bottom current at neap tide, and
- n = any positive integer (1, 2, 3. . . ).

* * * * *